United States Patent
Finegan, Jr.

(10) Patent No.: US 9,334,636 B1
(45) Date of Patent: May 10, 2016

(54) FAUCET SHAFT AND HANDLE SYSTEM

(71) Applicant: Stephen E. Finegan, Jr., Inverness, FL (US)

(72) Inventor: Stephen E. Finegan, Jr., Inverness, FL (US)

( * ) Notice: Subject to any disclaimer, the term of this patent is extended or adjusted under 35 U.S.C. 154(b) by 83 days.

(21) Appl. No.: 14/318,265

(22) Filed: Jun. 27, 2014

Related U.S. Application Data

(60) Provisional application No. 61/840,812, filed on Jun. 28, 2013.

(51) Int. Cl.
*F16K 31/60* (2006.01)
*E03C 1/04* (2006.01)

(52) U.S. Cl.
CPC .............. *E03C 1/0412* (2013.01); *F16K 31/60* (2013.01); *Y10T 137/6024* (2015.04); *Y10T 137/9464* (2015.04)

(58) Field of Classification Search
CPC ......... E03C 1/0412; E03C 1/04; F16K 35/06; F16K 31/60; F16K 31/605; F16K 31/607; Y10T 137/6014; Y10T 137/6024; Y10T 137/9464
USPC ........................ 251/292, 291; 279/60–65, 902
See application file for complete search history.

(56) References Cited

U.S. PATENT DOCUMENTS

| | | | | | |
|---|---|---|---|---|---|
| 386,263 | A | * | 7/1888 | Pedersen | B23B 31/202 251/292 |
| 524,848 | A | * | 8/1894 | Doebler | E05B 3/04 292/355 |
| 1,343,086 | A | * | 6/1920 | Neil | 279/60 |
| 1,506,773 | A | * | 9/1924 | Read | F16K 31/607 16/432 |
| 1,707,353 | A | * | 4/1929 | Fraser | F16K 31/60 251/292 |
| 1,741,588 | A | * | 12/1929 | Schneider | F16K 31/60 16/432 |
| 1,800,981 | A | * | 4/1931 | Beste | F16K 31/60 16/432 |
| 1,878,569 | A | * | 9/1932 | Zolleis | F16K 31/60 16/432 |
| 1,929,708 | A | * | 10/1933 | Morris | F16K 31/60 16/432 |
| 1,989,083 | A | * | 1/1935 | Dahnken | F16K 31/60 16/441 |
| 2,098,515 | A | * | 11/1937 | Pardieck | F16K 31/60 292/350 |
| 2,307,392 | A | * | 1/1943 | Crane | F16K 31/60 16/432 |
| 2,596,795 | A | * | 5/1952 | Schulze | F16K 31/60 403/258 |
| 2,686,530 | A | * | 8/1954 | Dire | F16K 27/12 137/375 |

(Continued)

*Primary Examiner* — Mary McManmon
*Assistant Examiner* — David Colon Morales

(57) ABSTRACT

A device has a shaft adapted to be rotated. The device has a handle adapted to be operatively coupled to the shaft and adapted to be grasped by a user and twisted in a first rotational direction, turning the shaft. An assembly is provided between the shaft and the handle. The assembly has lower end, formed with an opening and jaws, coupling the assembly to the shaft. The assembly has an upper end attached to the handle. In this manner the assembly rotates with the handle. The assembly has a nut rotatable with respect to the upper end and the handle. A threaded interface is provided between the nut and the jaws. In this manner rotation of the nut with respect to the upper end and the handle will radially constrict and extend the jaws. Further in this manner the handle will coupling and uncouple with the shaft.

1 Claim, 2 Drawing Sheets

(56) References Cited

U.S. PATENT DOCUMENTS

| | | | | |
|---|---|---|---|---|
| 2,797,941 | A * | 7/1957 | Manning | F16K 31/60 279/70 |
| 2,935,896 | A * | 5/1960 | Simon | F16K 31/60 403/362 |
| 3,000,642 | A * | 9/1961 | Kawasaki | B23B 31/123 279/62 |
| 3,241,869 | A * | 3/1966 | Bowers | F16K 31/60 279/57 |
| 3,243,210 | A * | 3/1966 | Manning | F16K 31/60 403/369 |
| 4,423,881 | A * | 1/1984 | Whitehead | B23B 31/1238 279/60 |
| 4,824,281 | A * | 4/1989 | Katsube | F16D 1/094 403/369 |
| 4,842,009 | A * | 6/1989 | Reback | F16K 31/60 137/315.15 |
| 5,025,826 | A * | 6/1991 | Schoepe | F16K 31/60 137/315.15 |
| 5,378,002 | A * | 1/1995 | Rohm | B23B 31/123 279/140 |
| 5,716,057 | A * | 2/1998 | Wright, Jr. | B23B 31/1238 279/123 |
| 6,341,783 | B1 * | 1/2002 | Rohm | B23B 31/123 279/140 |
| 6,363,579 | B1 * | 4/2002 | King, Jr. | F16K 31/607 16/430 |
| 2003/0077136 | A1 * | 4/2003 | Rohm | B23B 31/1071 408/239 R |
| 2009/0265891 | A1 * | 10/2009 | Pett | F16B 35/06 16/430 |
| 2011/0180155 | A1 * | 7/2011 | Shantzis | F16K 31/607 137/315.15 |
| 2012/0241654 | A1 * | 9/2012 | Clifford | F16K 31/60 251/96 |
| 2012/0266410 | A1 * | 10/2012 | Huang | F16K 31/60 16/110.1 |

* cited by examiner

FAUCET SHAFT AND HANDLE SYSTEM

BACKGROUND OF THE INVENTION

1. Field of the Invention

The present invention relates to a faucet shaft and handle system and more particularly pertains to removably coupling a handle to a faucet shaft, the faucet shaft being in any of a plurality of sizes and cross sectional configurations, the handle adapted to be coupled with respect to the faucet shaft as well as uncoupled without tools, the removable coupling being done in a safe, convenient and economical manner.

2. Related Application

This application is based upon pending Provisional Application No. 61/840,812 filed Jun. 28, 2014, the subject matter of which is incorporated herein by reference.

SUMMARY OF THE INVENTION

In view of the foregoing disadvantages inherent in the known types of faucet systems of known designs and configurations now present in the prior art, the present invention provides an improved faucet shaft and handle system. As such, the general purpose of the present invention, which will be described subsequently in greater detail, is to provide a new and improved faucet shaft and handle system and method which has all the advantages of the prior art and none of the disadvantages.

To attain this, the present invention essentially comprises a device. The device has a shaft. The shaft is adapted to be rotated. The device has a handle. The handle is adapted to be operatively coupled to the shaft. The handle is adapted to be grasped by a user. The handle is further adapted to be twisted in a first rotational direction. In this manner the shaft is turned. An assembly is provided between the shaft and the handle. The assembly has a lower end. The lower end is formed of a plurality of jaws. The lower end has an opening. In this manner the assembly is coupled to the shaft. The assembly has an upper end. The upper end is attached to the handle. In this manner the assembly rotates with the handle. The assembly has a nut. The nut is rotatable with respect to the upper end and the handle. A threaded interface is provided between the nut and the jaws. In this manner rotation of the nut with respect to the upper end and the handle will radially constrict and extend the jaws. Further in this manner the handle will coupling and uncouple with the shaft.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved faucet shaft and handle system which has all of the advantages of the prior art faucet systems of known designs and configurations and none of the disadvantages.

It is another object of the present invention to provide a new and improved faucet shaft and handle system which may be easily and efficiently manufactured and marketed.

It is further object of the present invention to provide a new and improved faucet shaft and handle system which is of durable and reliable constructions.

An even further object of the present invention is to provide a new and improved faucet shaft and handle system which is susceptible of a low cost of manufacture with regard to both materials and labor, and which accordingly is then susceptible of low prices of sale to the consuming public, thereby making such faucet shaft and handle system economically available to the buying public.

Lastly, another object of the present invention is to provide a faucet shaft and handle system for removably coupling a handle to a faucet shaft, the faucet shaft being in any of a plurality of sizes and cross sectional configurations, the handle adapted to be coupled with respect to the faucet shaft as well as uncoupled without tools, the removable coupling being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
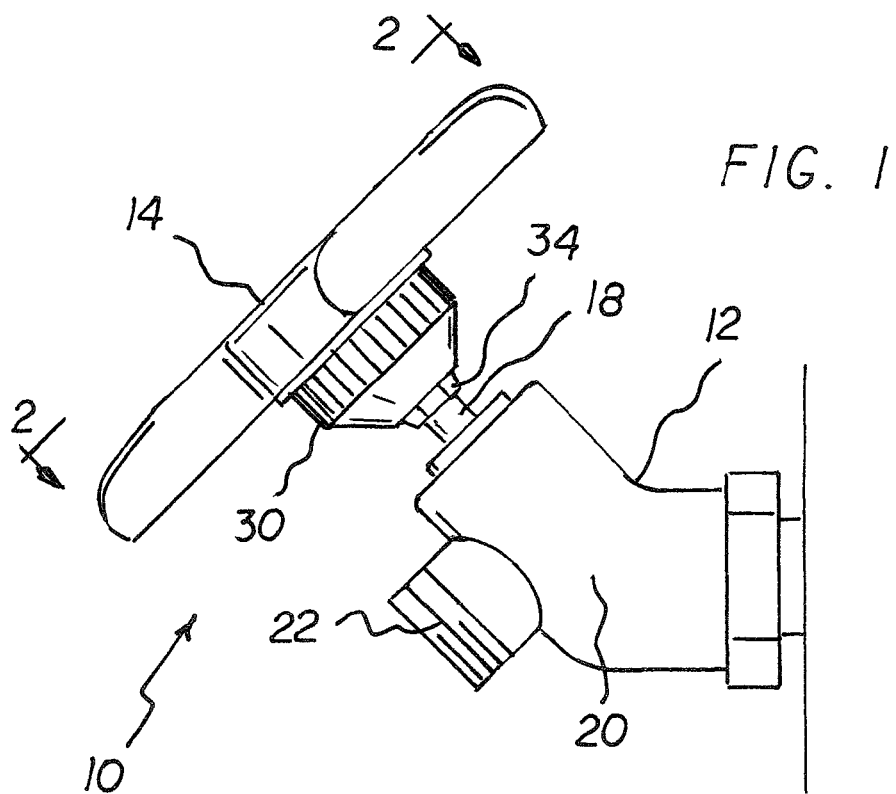
FIG. 1 is a perspective illustration of a faucet shaft and handle system constructed in accordance with the principles of the present invention.
Figure 2:
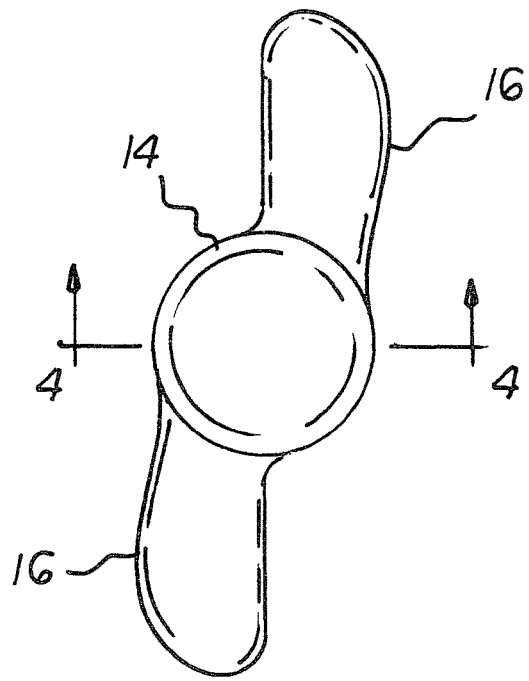
FIG. 2 is a perspective illustration of the handle assembly shown in FIG. 1.
Figure 3:
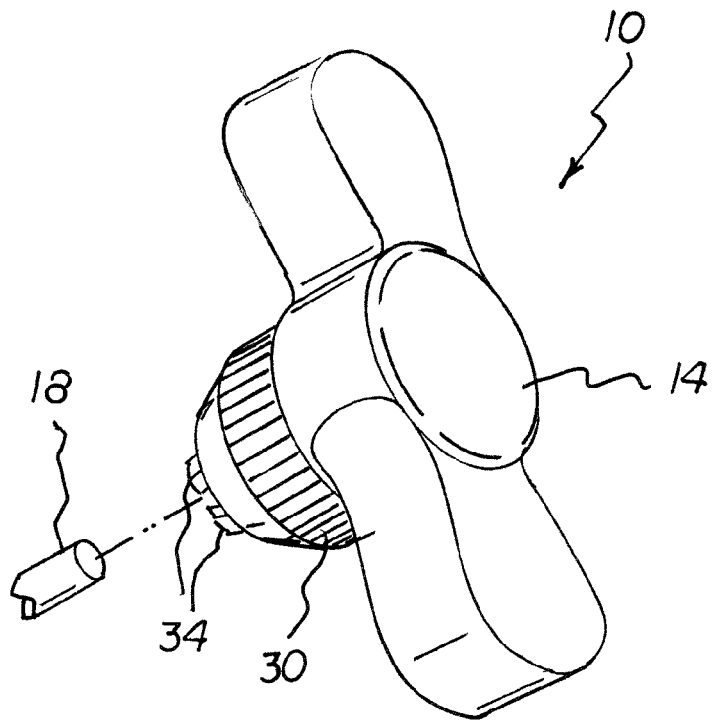
FIG. 3 is a side elevational view of the handle assembly shown in FIG. 2.
Figure 4:
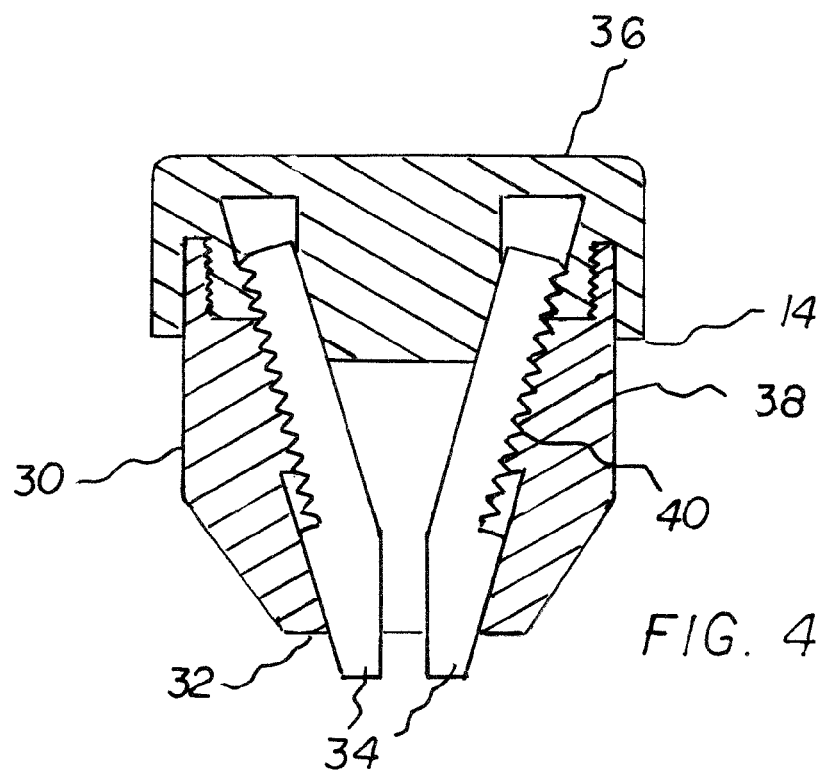
FIG. 4 is a cross sectional view taken along line 4-4 of FIG. 3.

With reference now to the drawings, and in particular to FIG. 1 thereof, the preferred embodiment of the new and improved faucet shaft and handle system embodying the principles and concepts of the present invention and generally designated by the reference numeral 10 will be described.

The present invention, the faucet shaft and handle system 10 is comprised of a plurality of components. Such components in their broadest context include a device, a handle, and an assembly. Such components are individually configured and correlated with respect to each other so as to attain the desired objective.

First provided is a faucet 12. The faucet has a main body portion 20. The main body portion is adapted to be attached to a recipient surface such as a wall of a building. The main body portion is operatively coupled to a source of supply water. The faucet has a threaded outlet 22. In this manner water from the source of supply water is dispensed. The faucet has a valve. The valve is provided interiorly of the main body portion. The valve is rotatable between an open orientation and a closed orientation. The faucet shaft 18 extends generally vertically upwardly from the main body portion. The faucet shaft has a lower interior end. The lower interior end is attached to the valve. The faucet shaft has an upper end. The upper end is provided above the main body portion.

A handle is provided. The handle has an ergonomic design. The handle is operatively coupled to the faucet shaft. The handle has laterally extending arcuate sides 16. The sides are adapted to be grasped by a user. The sides are also adapted to be twisted in a first rotational direction. In this manner the valve is turned to a closed orientation. Further in this manner the flow of supply water through the outlet is terminated. The sides are further adapted to be twisted in a reverse rotational direction. In this manner the valve is turned to an open orientation. Further in this manner the flow of supply water is caused to flow through the outlet. It should be understood that any of a plurality of handle shapes and sizes may be used in the system of the present invention at the discretion of the user, as for example, circular, oval, linear, etc.

Provided last is an assembly 30. The assembly is provided between the faucet shaft and the handle. The assembly has a maximum diameter less than a maximum diameter of the handle. The assembly has a lower end 32. The lower end has a plurality of jaws 34. An opening is provided between the jaws. In this manner the assembly is coupled and uncoupled to the faucet shaft. The jaws are axially movable to a constricted orientation for grasping the faucet shaft regardless of the size and shape of the faucet shaft. The jaws are axially movable to an extended orientation for releasing the faucet shaft. The assembly has an upper end 36. The upper end is attached to the handle. In this manner the handle rotates with the assembly. The assembly has a nut 38. The nut has a ribbed exterior surface. The nut is rotatable with respect to the upper end and the handle. The assembly has a threaded interface 40. The threaded interface is provided between the nut and the jaws. In this manner rotation of the nut with respect to the upper end and the handle will radially constrict and extend the jaws. Further in this manner the assembly is coupled and uncoupled with the faucet shaft. The upper end is adapted to be separated from the nut and the jaws through reverse rotation. In this manner changing the upper end to an alternate design is facilitated.

It should be understood that the device of the system may be any of a plurality of devices, such as a spigot, grill, compressor, welding tank, appliance, or a drill chuck.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A faucet shaft and handle system (10) for removably coupling a handle (14) to a faucet shaft (18), the faucet shaft being in any of a plurality of sizes and cross sectional configurations, the handle adapted to be coupled with respect to the faucet shaft as well as uncoupled without tools, the system comprising, in combination:

a faucet (12) having a main body portion (20) adapted to be attached to a recipient surface, the main body portion operatively coupled to a source of supply water, the faucet having a threaded outlet (22) for the dispensing of water from the source of supply water, the faucet having a valve interiorly of the main body portion and rotatable between an open orientation and a closed orientation, the faucet shaft (18) extending generally vertically upwardly from the main body portion, the faucet shaft having a lower interior end attached to the valve, the faucet shaft having an upper end above the main body portion;

the handle (14) operatively coupled to the faucet shaft, the handle having laterally extending arcuate sides (16) adapted to be grasped by a user and twisted in a first rotational direction to turn the valve to a closed orientation for terminating the flow of supply water through the threaded outlet, the laterally extending sides adapted to be grasped by a user and twisted in a reverse rotational direction to turn the valve to an open orientation for causing the flow of supply water through the threaded outlet; and an assembly (30) between the faucet shaft and the handle, the assembly having a maximum diameter less than a maximum diameter of the handle, the assembly having a lower end (32) formed of a plurality of jaws (34), the jaws having threaded exterior surfaces, the jaws having unthreaded interior surfaces with an opening between the jaws for coupling to the faucet shaft, the jaws being elevationally slidable against the handle, the jaws being axially movable to a constricted orientation for grasping the faucet shaft regardless of the size and shape of the faucet shaft, the jaws being axially movable to an extended orientation for releasing the faucet shaft, the assembly having an upper end (36) attached to the handle for rotation therewith, the assembly having a nut (38), the nut having a threaded interior surface, the nut having a ribbed exterior surface rotatable with respect to the upper end and the handle, a threaded interface (40) between the nut and the jaws whereby rotation of the nut with respect to the upper end and the handle will radially constrict and extend the jaws for coupling and uncoupling with the faucet shaft, the upper end adapted to be separated from the nut and the jaws through reverse rotation to facilitate changing the upper end.

\* \* \* \* \*